(No Model.)
R. G. HEBDEN & W. THORPE.
DUST PAN.
No. 390,781. Patented Oct. 9, 1888.
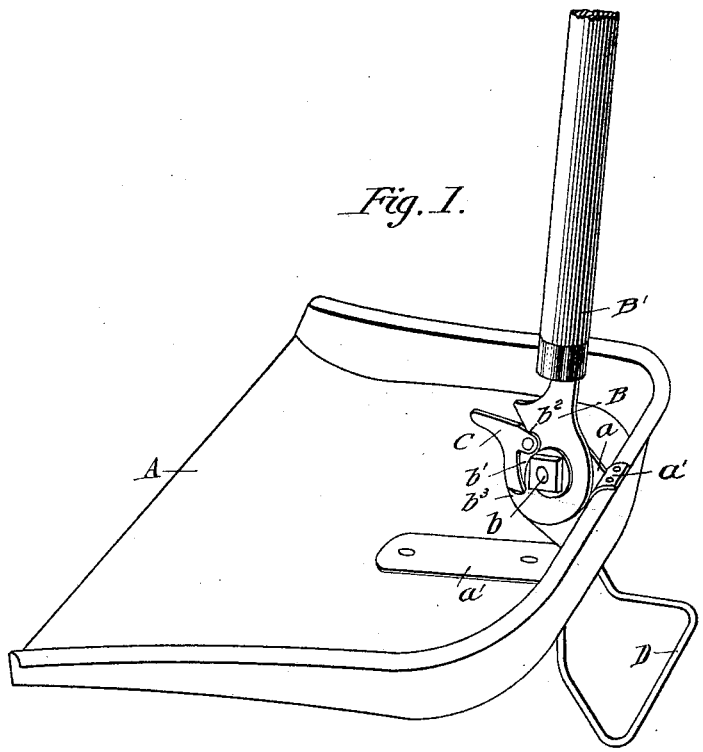
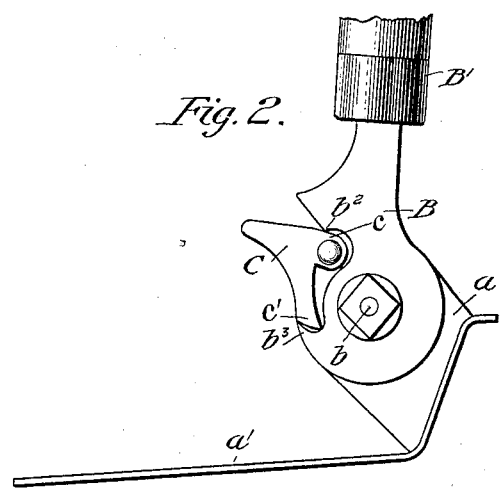
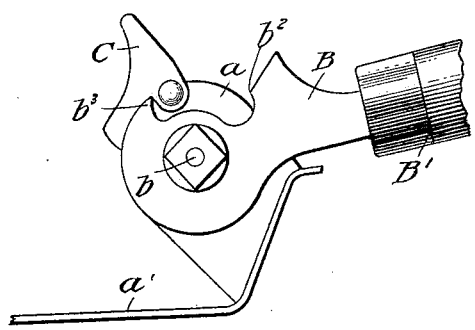
Witnesses,
H. W. Wells.
A. Keithley.
Inventors,
Richard G. Hebden.
William Thorpe.
By Wilts Greenmead
Attorneys.

UNITED STATES PATENT OFFICE.

RICHARD G. HEBDEN AND WILLIAM THORPE, OF EL PASO, ILLINOIS.

DUST-PAN.

SPECIFICATION forming part of Letters Patent No. 390,781, dated October 9, 1888.

Application filed December 16, 1886. Serial No. 221,736. (No model.)

*To all whom it may concern:*

Be it known that we, RICHARD G. HEBDEN and WILLIAM THORPE, citizens of the United States, residing at El Paso, in the county of Woodford and State of Illinois, have invented certain new and useful Improvements in Dust-Pans; and we do hereby declare that the following is a full, clear, and exact description of the invention, which will enable others skilled in the art to which it appertains to make and use the same.

This invention relates to dust-pans.

The object of the invention is to provide a dust-pan which may be used by a person in a standing position; furthermore, the object is to produce a dust-pan which may be used either in a standing or in a stooped position; furthermore, the object is to produce a dust-pan so constructed that it may be pressed upon the floor firmly while the dust is being swept upon it; and, finally, the object is to produce a dust-pan which may be adjusted speedily and with slight manipulation either to a position adapting it for use by a person in an erect position or by one in a stooped position.

The invention is illustrated in the accompanying drawings, in which—

Figure 1 is a perspective view of a dust-pan made in accordance with our invention. Fig. 2 is a side elevation of the plates and catch by which the dust-pan and the handle are connected, the catch being shown in a position to retain the handle in an upright position; and Fig. 3 is a similar view, the catch being shown in a position to allow the handle to assume a horizontal position relative to the pan or to be turned to a vertical position.

In the drawings, A represents the dust-pan, which may be, and preferably is, of the ordinary construction. At the rear part of the pan is a projecting plate, $a$, which may be attached to or formed with the pan. This projection is preferably formed with a plate, $a'$, which is preferably riveted to the pan in order to strengthen the same at the point where most strain comes while the pan is in use. To this plate is secured, by a bolt, $b$, in such manner as to permit a free vibration, the plate B, to which to secure the handle B'. The handle B' is of such length that a person may grasp its upper end without stooping while the pan rests upon the floor. The lower portion of the plate B is provided with the indentation $b'$, with the projection $b^2$ and the projection $b^3$, situated at the ends of the indentations.

The plate $a$ is provided with a hinged latch, C, of a length corresponding to the length of the indentation in the plate. The arrangement of the latch and the indented plates is such that as the handle is turned from a horizontal to a vertical position the projection $b^2$ comes in contact with projection $c$ of the catch, and as a vertical position is reached the stop is pushed into the notch, and the point $c'$ of the stop abuts against the projection $b^3$ of the plate B, thus automatically locking the handle in place.

The projection $b^3$ overhangs the indentation a short distance, in order firmly to lock the catch against displacement by jarring while the pan is in use, with the handle at right angles to the pan. When it is desired to relieve the handle from the locked position, it is necessary to turn the handle toward a horizontal position at the same time the catch is lifted. The catch C is, in fact, a gravity-pawl, adapted to engage the notch in the plate B and prevent rotation of the plate B in either direction with reference to the plate $a$.

D represents a projection, of wire or sheet metal, which is attached to the rear end of the pan, and which rests on the floor when the pan is in a position to receive dust. The projection elevates the rear end of the pan, and by placing the foot on the projection the pan may be held firmly in place without requiring the use of the hands.

We are aware that it has been proposed to provide a dust-pan with a hinged or jointed handle, as well as to attach to it suitable lugs adapted to raise its rear edge above the floor when the pan is in use. The device shown herein by means of which the handle is held at the desired working angle to the pan is, however, wholly different from the corresponding feature of any prior structure, and the support which we have applied to the rear of the pan is novel, in that it consists of a transverse rod resting on the floor when the pan is in use and connected to the pan by integrally-formed arms. This transverse rod supplies a means of steadying the pan by means of the pressure of the operator's foot—a new and important advantage.

Having thus described our invention, what we claim as new, and desire to secure by Letters Patent, is—

The combination, with a dust-pan, of a vertical plate, $a$, rigidly secured thereto and having the centrally-pivoted pawl C, and the plate B, rigidly secured to the handle and having in its margin a notch, $b'$, with overhanging end walls, $b^2 b^3$, whereby said pawl falling into said notch may lock the handle with reference to rotation upon the pivot $b$, substantially as set forth.

In testimony whereof we affix our signatures in presence of two witnesses.

RICHARD G. HEBDEN.
WILLIAM THORPE.

Witnesses:
J. A. WILSON,
T. D. FLOWERS.